US007816871B2

(12) United States Patent
Takagi et al.

(10) Patent No.: US 7,816,871 B2
(45) Date of Patent: Oct. 19, 2010

(54) PROJECTOR AND METHOD OF TURNING ON LIGHT SOURCE DEVICE OF PROJECTOR

(75) Inventors: Shigekazu Takagi, Shimosuwa (JP); Yutaka Takada, Minami-Minowa (JP); Satoshi Fujii, Sanda (JP)

(73) Assignee: Seiko Epson Corporation (JP)

( * ) Notice: Subject to any disclaimer, the term of this patent is extended or adjusted under 35 U.S.C. 154(b) by 1023 days.

(21) Appl. No.: 11/554,773

(22) Filed: Oct. 31, 2006

(65) Prior Publication Data

US 2007/0103650 A1 May 10, 2007

(30) Foreign Application Priority Data

Nov. 1, 2005 (JP) ............... 2005-318029

(51) Int. Cl.
*H01J 25/50* (2006.01)
*H01J 23/36* (2006.01)
*G03B 21/20* (2006.01)

(52) U.S. Cl. ...................... 315/39.53; 353/85
(58) Field of Classification Search .................. 219/690
See application file for complete search history.

(56) References Cited

U.S. PATENT DOCUMENTS

| 6,137,237 | A * | 10/2000 | MacLennan et al. | 315/248 |
| 7,036,939 | B2 * | 5/2006 | Cole et al. | 353/52 |
| 2002/0011802 | A1 * | 1/2002 | Espiau et al. | 315/246 |
| 2002/0140907 | A1 * | 10/2002 | Fujimori | 353/31 |

FOREIGN PATENT DOCUMENTS

| JP | 6-17195 | 3/1994 |
| JP | 06-151077 | 5/1994 |
| JP | 09-082112 | 3/1997 |
| JP | 09-245746 | 9/1997 |
| JP | 11-345598 | 12/1999 |
| JP | 2001-155882 | 6/2001 |
| JP | 2001-202923 | 7/2001 |
| JP | 2001-266803 | 9/2001 |
| JP | 2001-338620 | 12/2001 |
| JP | 2001-351791 | 12/2001 |
| JP | 2002-141026 | 5/2002 |

(Continued)

OTHER PUBLICATIONS

JP H06-17195 (English translation of paragraph 0015, 0024 and 0026), Mar. 4, 1994.*

(Continued)

*Primary Examiner*—Georgia Y Epps
*Assistant Examiner*—Ryan Howard
(74) *Attorney, Agent, or Firm*—Harness, Dickey & Pierce, P.L.C.

(57) ABSTRACT

To provide a projector using a light source device that is rapidly and reliably turned on and can stably obtain a desired amount of light and a method of rapidly and reliably turning on a light source device of a projector.

A power control unit adjusts the amplification factor of an amplifying unit for microwaves such that microwave power having a pulse form that is higher than the microwave power radiated to keep an electrodeless lamp emitting light is radiated to turn on the electrodeless lamp. Therefore, a microwave having predetermined power is radiated to the electrodeless lamp at once.

6 Claims, 12 Drawing Sheets

FOREIGN PATENT DOCUMENTS

| | | |
|---|---|---|
| JP | 2002-203523 | 7/2002 |
| JP | 2002-280191 | 9/2002 |
| JP | 2003-195418 | 7/2003 |
| JP | 2003-249197 | 9/2003 |
| JP | 2004-505429 | 2/2004 |
| JP | 2004-312309 | 11/2004 |
| JP | 2005-051350 | 2/2005 |
| JP | 2005-079088 | 3/2005 |
| JP | 2005-129408 | 5/2005 |
| JP | 2005-174928 | 6/2005 |
| JP | 2006-128075 | 5/2006 |

OTHER PUBLICATIONS

JP 2004-312309 A (Machine Translation in English), Nov. 4, 2004.*
Shinomiya; Electrodeless Discharge Lamp Lighting Device; Mar. 4, 1994; JP 06-017195 (full translation).*

* cited by examiner

PROJECTOR AND METHOD OF TURNING ON LIGHT SOURCE DEVICE OF PROJECTOR

TECHNICAL FIELD

The present invention relates to a projector including a light source device using microwaves and a method of turning on the light source device of the projector.

BACKGROUND ART

Projectors for projecting images on the basis of image signals have been used for presentation in the meeting or home theaters. As a light source for the projector, a light source capable of rapidly turning on and stably ensuring the quantity of light with high brightness is used to rapidly obtain a bright projected image, or a light source capable of adjusting the quantity of light without changing an emission spectrum is used to obtain a bright projected image most suitable for a projection environment.

Discharge lamps, such as a halogen lamp, a metal halide lamp, and a high-pressure mercury lamp, have come into widespread use in the projectors on the market. This is because the discharge lamp can obtain high brightness.

The discharge lamp needs discharge electrodes for making a discharge medium, such as gas filled in the lamp, emit light by discharge. However, the discharge lamp has the following problems due to the discharge electrodes.

The abrasion of the discharge electrodes due to discharge causes the distance between the electrodes to increase, which results in a variation in the emission spectrum. In addition, a light source becomes large, which may have an effect on a projected image. Further, the orbit of discharge arc moves, which may cause a flicker due to an arc shift. Further, in the lost phase in which the electrodes are abraded to a large degree, there has a problem in that discharge may not occur.

Further, the internal temperature and pressure of the discharge lamp need to increase and the discharge medium, such as gas, needs to be sufficiently excited until the quantity of light emitted from the discharge lamp reaches a predetermined value. In this case, it takes a predetermined amount of time to obtain the necessary amount of light. In addition, a current equal to or larger than a predetermined value is needed to maintain the discharge after the discharge lamp is turned on. In this case, it is difficult to adjust the quantity of light. Therefore, a projector having an iris for adjusting the quantity of light around a light source has been proposed.

In order to solve these problems due to the electrodes, JP-A-2001-155882 discloses a projector using an electrodeless lamp as a light source device. In the light source device of the projector, a magnetron, which is a kind of vacuum tube having electrodes, generates microwaves, and the microwaves are radiated onto an electrodeless lamp having rare gas or rare-earth metal halogen compound, serving as a discharge medium, filled therein to emit light by plasma discharge. This structure makes it possible to provide a projector having an electrodeless lamp, which is a point light source having high brightness and a long life span, as a light source.

In order to start the light emission of the electrodeless lamp, a microwave having predetermined power needs to be radiated at once to start plasma discharge.

It is necessary to preheat the magnetron for a predetermined period of time in order to start the magnetron to obtain a predetermined microwave. For example, JP-A-9-82112 discloses a power supply for an electrodeless lamp. In JP-A-9-82112, when the preheating temperature is high, the frequency characteristics of microwaves generated by the magnetron deteriorate. Therefore, temperature control is performed to reduce the preheating temperature when the electrodeless lamp is turned on.

FIG. 13 is a diagram illustrating the frequency characteristics of the microwaves generated by the magnetron. The frequencies of the microwaves are distributed with the center at a frequency of about 2.45 GHz, and many noise components are included in a frequency band of about 2.25 to 2.65 GHz. It has been known that, when output microwave power varies, the frequency characteristics vary.

However, in the light source devices disclosed in JP-A-2001-155882 and JP-A-9-82112, the magnetron requiring preheating is used for a source for generating microwaves. Therefore, it takes a predetermined amount of time for the electrodeless lamp to start emitting light, which makes it difficult to rapidly turn on the electrodeless lamp.

Further, in order to start the light emission of the electrodeless lamp, a microwave having predetermined power needs to be radiated at once to start plasma discharge. However, this is not disclosed in JP-A-2001-155882 and JP-A-9-82112, and thus it is difficult for the related art to reliably turn on the electrodeless lamp.

Furthermore, when output microwave power varies, the frequency characteristics of the magnetron vary, which makes it difficult to adjust the quantity of light without changing the emission spectrum of the electrodeless lamp.

As described above, the light source devices of the projectors according to the related art have problems in that it is difficult to rapidly and reliably turn on the light source device and the light source device does not stably obtain a predetermined amount of light.

In order to solve the above-mentioned problems, it is an object of the invention to provide a projector having a light source device capable of being rapidly and reliably turned on and stably obtaining a predetermined quantity of light and a method of turning on the light source device of the projector reliably and rapidly.

DISCLOSURE OF THE INVENTION

According to an aspect of the invention, there is provided a projector for projecting an image on the basis of image information. The projector includes a light source device that is used as a light source for the projected image. The light source device includes: a solid-state high-frequency oscillator that generates microwaves; an amplifying unit that amplifies the microwaves output from the solid-state high-frequency oscillator; a light emitting body that has a material emitting light by the microwaves filled therein; and a power control unit that adjusts the amplification factor of the amplifying unit for the microwave. In the projector, the power control unit adjusts the amplification factor of the amplifying unit such that microwave power having a pulse form that is higher than the microwave power radiated to keep the light emitting body emitting light is radiated to the light emitting body to turn on the light emitting body.

In the projector according to the above-mentioned aspect, preferably, the light source device further includes: an antenna that radiates the microwaves amplified by the amplifying unit; and a hollow cavity that has at least a portion of the antenna and the light emitting body accommodated therein and is sealed. Preferably, the inner surface of the hollow cavity is a curved surface that reflects the microwaves radiated from the antenna to be concentrated on the light emitting body.

In the projector according to the above-mentioned aspect, preferably, the light source device further includes an isolator that is provided between the amplifying unit and the antenna and prevents some of the microwaves that have been radiated from the antenna and reflected from the inner surface of the cavity from returning to the antenna.

In the projector according to the above-mentioned aspect, preferably, the light source device further includes: a traveling wave detecting unit that is provided between the amplifying unit and the antenna to detect traveling microwave power traveling toward the antenna; a reflected wave detecting unit that is provided between the amplifying unit and the antenna to detect the reflected microwave power; and a matching unit that is provided between the traveling wave detecting unit and/or the reflected wave detecting unit and the antenna to adjust impedance matching between the amplifying unit side and the antenna side. Preferably, the projector further includes a control unit that controls at least a start operation of the projector. The control unit controls the matching unit to adjust impedance such that the reflected microwave power detected by the reflected wave detecting unit becomes smaller.

In the above-mentioned aspect, preferably, the projector further includes: a control unit that controls at least a start operation of the projector; and a storage unit. In this structure, preferably, the light source device further includes: a traveling wave detecting unit that is provided between the amplifying unit and the antenna to detect traveling microwave power traveling toward the antenna; a reflected wave detecting unit that is provided between the amplifying unit and the antenna to detect the reflected microwave power; and a matching unit that is provided between the traveling wave detecting unit and/or the reflected wave detecting unit and the antenna to adjust impedance matching between the amplifying unit side and the antenna side. Preferably, the storage unit stores at least the traveling microwave power detected by the traveling wave detecting unit, the reflected microwave power detected by the reflected wave detecting unit, and a matching constant table for defining adjustment values of the matching unit for the detected power. Preferably, when the traveling microwave power is detected by the traveling wave detecting unit and the reflected microwave power is detected by the reflected wave detecting unit, the control unit extracts a corresponding adjustment value from the matching constant table and sets the extracted adjustment value to the matching unit.

In the above-mentioned aspect, preferably, the projector further includes: a control unit that controls at least a start operation of the projector; and a light detecting unit that includes an optical sensor for detecting the quantity of light emitted from the light emitting body. Preferably, the light source device further includes a matching unit that adjusts impedance matching between the amplifying unit side and the antenna side, and the control unit controls the matching unit to adjust impedance such that the quantity of light detected by the light detecting unit becomes larger when the microwave power is the same.

In the above-mentioned aspect, preferably, the projector further includes: a temperature detecting unit that includes a temperature sensor for detecting the temperature around the light emitting body. Preferably, the control unit controls the temperature detecting unit to detect the temperature around the light emitting body. When the detected temperature is equal to or larger than a predetermined limited temperature, the control unit does not turn on the light source device.

In the projector according to the above-mentioned aspect, preferably, the solid-state high-frequency oscillator is a surface acoustic wave oscillator having a surface acoustic wave resonator, and the surface acoustic wave resonator includes a piezoelectric layer that is formed on a diamond layer or a diamond-like carbon layer, and a comb-shaped electrode that is formed on the piezoelectric layer.

In the projector according to the above-mentioned aspect, preferably, the microwaves are signals in a frequency band of 300 MHz to 30 GHz.

In the above-mentioned aspect, preferably, the projector further includes light modulating devices. In this structure, preferably, the image information is image signals for defining an image, and each of the light modulating devices modulates light emitted from the light emitting body on the basis of the image signals to generate modulated light for forming an image. In addition, preferably, the light modulating device is any one of a transmissive liquid crystal panel, a reflective liquid crystal panel, and a tilt mirror device.

According to another aspect of the invention, there is provided a method of turning on a light source device of a projector that projects an image. The light source device includes: a solid-state high-frequency oscillator that generates microwaves; an amplifying unit that amplifies the microwaves output from the solid-state high-frequency oscillator; a light emitting body that has a material emitting light by the microwaves filled therein; and a power control unit that adjusts the amplification factor of the amplifying unit for the microwave. The method includes the steps of: radiating to the light emitting body microwave power having a pulse form that is higher than the microwave power capable of keeping the light emitting body emitting light; and radiating predetermined microwave power to the light emitting body.

BEST MODE FOR CARRYING OUT THE INVENTION

Hereinafter, exemplary embodiments of the invention will be described in detail below with reference to the accompanying drawings.

First Embodiment

<Outline of First Projector>

Figure 1:
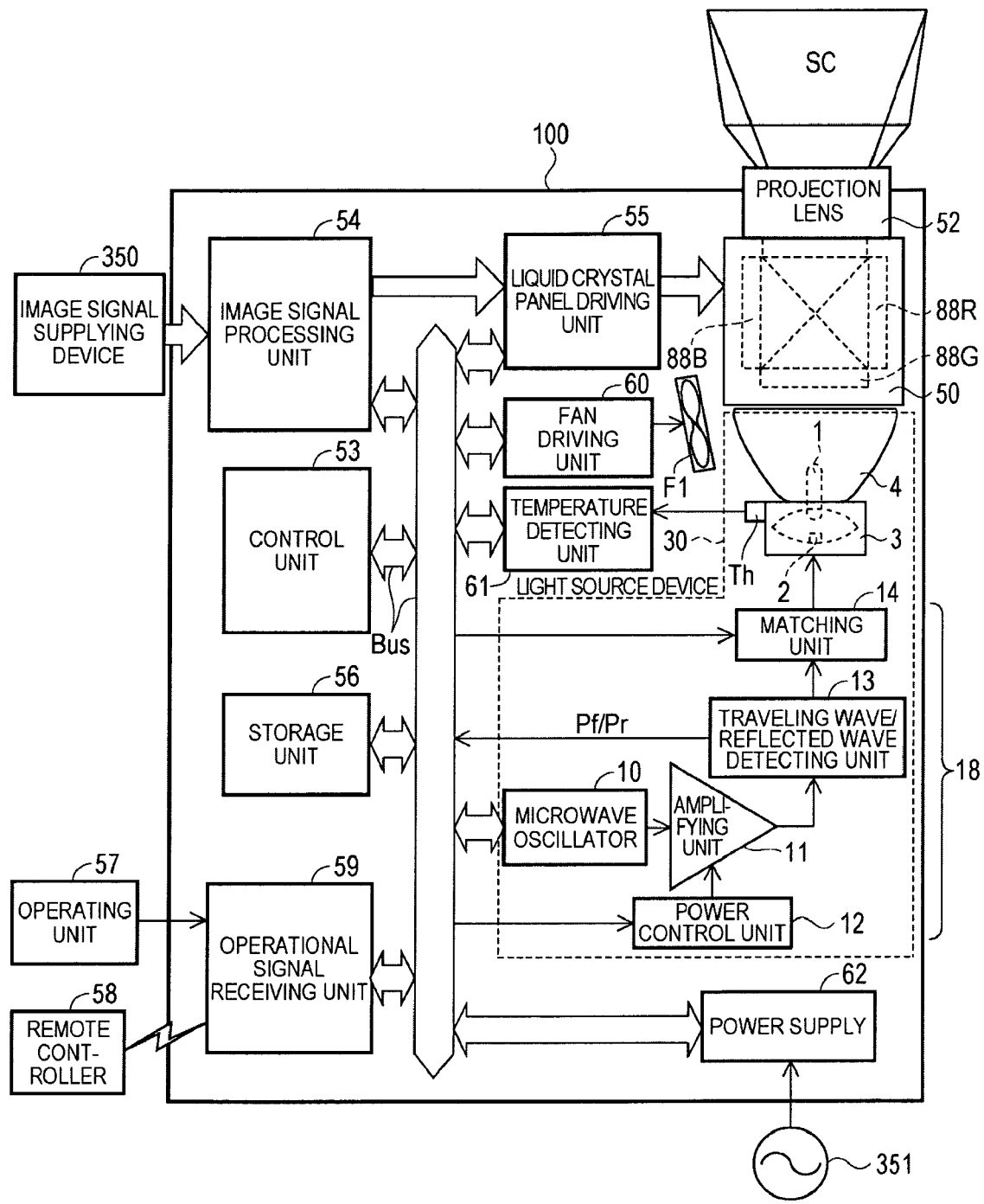
FIG. 1 is a diagram schematically illustrating the structure of a projector according to a first embodiment of the invention.

FIG. 1 is a diagram schematically illustrating the structure of a projector according to a first embodiment of the invention.

A projector 100 is a so-called projector of a three liquid crystal panel type in which light emitted from a light source device 30 is separated into three color light components, that is, red, green, and blue light components, the separated light components are modulated by red, green, and blue liquid crystal light valves 88R, 88G, and 88B, serving as light modulating devices, according to image signals, the modulated light components are combined into a full color optical image, and the full color optical image is enlarged and projected onto a screen SC by a projection lens 52. The liquid crystal light valves 88R, 88G, and 88B are provided for the red, green, and blue light components, respectively, and are included in the structure of an optical unit 50.

In the light source device 30, an electrodeless lamp 1, serving as a light emitting body (hereinafter, referred to as a light emitter), is used as a light source. A light emitting material is filled in the electrodeless lamp 1, and microwaves radiated from an antenna 2 excite the light emitting material, thereby emitting light by means of plasma emission. The microwaves radiated from the antenna 2 are generated by a microwave oscillator 10 serving as a solid-state high-frequency oscillator. The term "high frequency" means frequency in a frequency band, such as a UHF band (300 MHz to 3 GHz) or an SHF band (3 GHz to 30 GHz). The term "solid-state" of the solid-state high-frequency oscillator is an expression in contrast to a gas oscillator, such as a vacuum tube using, for example, a magnetron, and means an oscillator using solid such as diamond.

<Outline of Microwave Oscillator>

Figure 2:
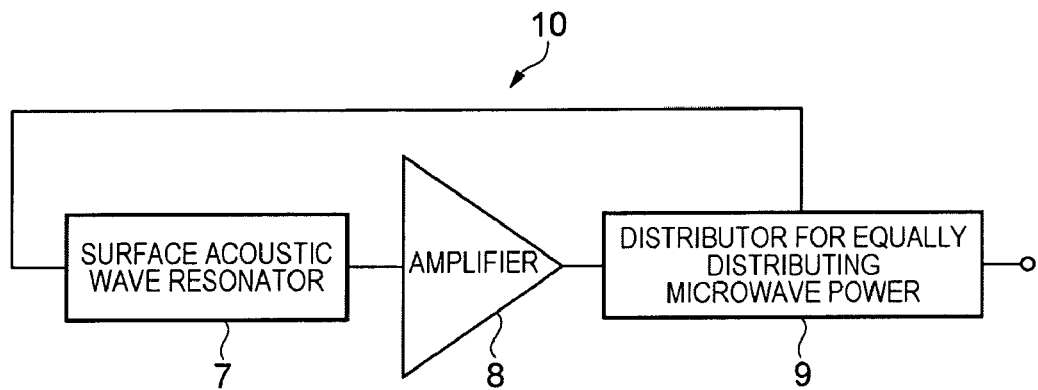
FIG. 2 is a diagram schematically illustrating the structure of a microwave oscillator.
Figure 3A:
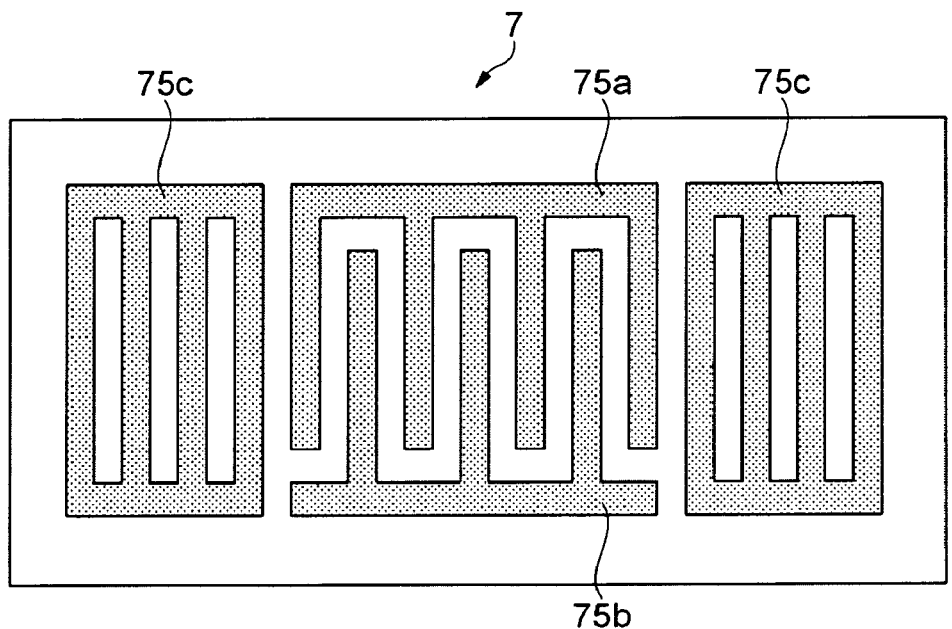
FIG. 3A is a plan view schematically illustrating a diamond SAW resonator.
Figure 3B:
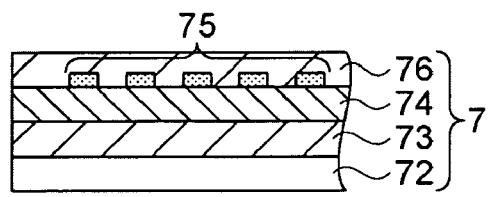
FIG. 3(b) is a cross-sectional view schematically illustrating the diamond SAW resonator.
Figure 4:
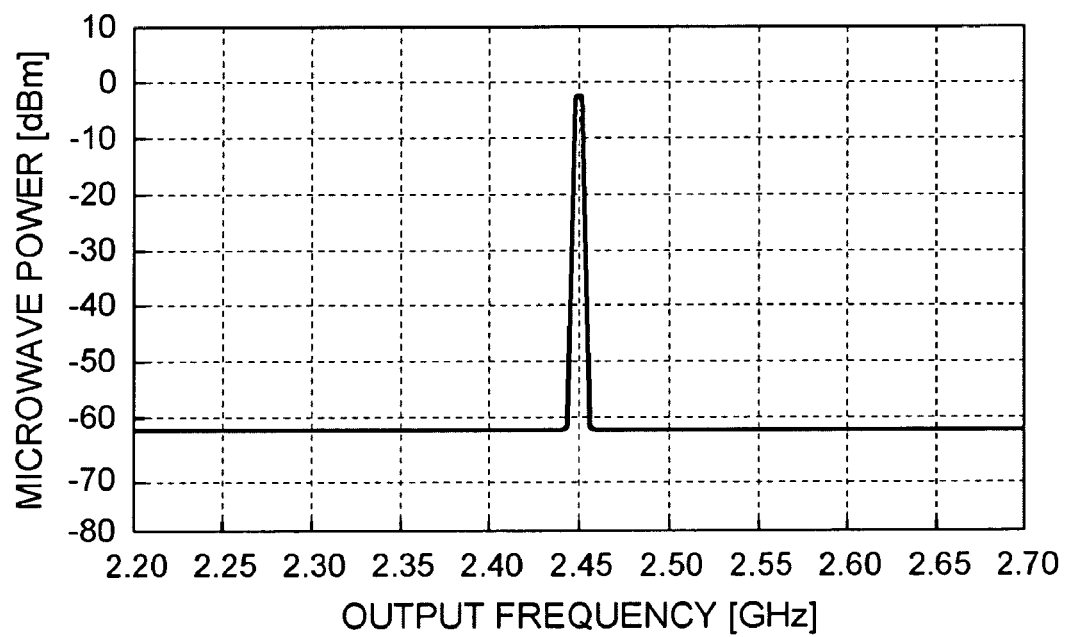
FIG. 4 is a diagram illustrating an example of an output frequency characteristic of the diamond SAW resonator.

FIG. 2 is a block diagram schematically illustrating the structure of the microwave oscillator. FIG. 3(a) is a plan view schematically illustrating a diamond SAW resonator, and FIG. 3(b) is a cross-sectional view schematically illustrating the diamond SAW resonator. FIG. 4 is a diagram illustrating an example of an output frequency characteristic of the diamond SAW resonator.

Next, the microwave oscillator 10 of the light source device 30, which is one of characteristics of the invention, will be described in detail with reference to FIG. 2 and FIGS. 3A and 3B.

The microwave oscillator 10 is a surface acoustic wave (hereinafter, referred to as SAW) oscillator including a surface acoustic wave resonator, and uses a SAW resonator in which a diamond monocrystalline layer is used for an elastic body transmitting surface acoustic waves.

The microwave oscillator 10 includes a SAW resonator 7, an amplifier 8, and a distributor 9 for equally distributing microwave power.

The SAW resonator 7 is a diamond SAW resonator, and the detailed structure thereof is shown in FIGS. 3A and 3B.

As shown in FIG. 3(b), the SAW resonator 7 includes a silicon substrate 72, serving as a base, and a diamond monocrystalline layer 73 formed on the silicon substrate 72.

A piezoelectric layer 74, such as a zinc oxide (ZnO) film, is formed on the diamond monocrystalline layer 73.

Further, an electrode 75 including a comb-shaped electrode (IDT (inter digital transducer) electrode) for exciting surface acoustic waves is provided on the piezoelectric layer 74.

A silicon oxide layer 76 is formed on the electrode 75. Since the temperature dependence of the operational frequency of the silicon oxide layer 76 is opposite to that of the diamond monocrystalline layer 73, the piezoelectric layer 74, and the electrode 75, the silicon oxide layer 76 provided on the uppermost layer makes it possible to improve the temperature characteristic.

Further, it is preferable that the diamond monocrystalline layer 73 be formed by a gas phase synthesizing method. Alternatively, a hard carbon layer having an elastic modulus close to polycrystalline diamond may be used. In addition, the piezoelectric layer 74 may be formed of AlN or Pb(Zr, Ti)O2 other than ZnO by a sputtering method or a gas phase synthesizing method.

As shown in FIG. 3(a), the electrode 75 includes IDT electrodes 75a and 75b, which are a pair of comb-shaped electrodes arranged so as to engage with each other, and a reflector electrode 75c that is provided at both sides of the IDT electrodes and reflects surface acoustic waves.

When an electric signal is input to the IDT electrode 75a, the SAW resonator 7 excites a surface acoustic wave on the base including the diamond monocrystalline layer 73 and holds the surface acoustic waves between both sides of the reflector 75c. The held surface acoustic waves are multiply reflected between both sides of the reflector 75c, which causes a stationary wave to be generated between both sides of the reflector 75c.

When the surface acoustic wave reaches the IDT electrode 75b, the SAW resonator 7 outputs an electric signal having a frequency (microwave) corresponding to the frequency of the surface acoustic wave.

Referring to FIG. 2 again, the amplifier 8 is provided in the next stage of the SAW resonator 7 and amplifies a microwave oscillated by the SAW resonator 7 into a microwave having predetermined power.

The distributor 9 equally distributes the microwave power output from the amplifier 8 to the outside and the SAW resonator 7.

The SAW resonator 7, the amplifier 8, and the distributor 9 are connected to one another such that the impedances thereof are matched to, for example, 50 ohm, and form the microwave oscillator 10, which is a feedback oscillating circuit.

The SAW resonator 7 uses diamond as an elastic body, and thus generates a surface acoustic wave having a high transmission speed higher than 10000 m/s.

This characteristic enables the microwave oscillator 10 to directly oscillate microwaves without using a frequency multiplying circuit provided with, for example, a PLL (phase locked loop) circuit. The IDT electrodes 75a and 75b of the SAW resonator 7 can be configured such that the widths thereof are larger than that of another elastic body, such as liquid crystal or ceramic. Therefore, the IDT electrodes 75a and 75b of the SAW resonator 7 can have a good power-resistant characteristic and a small variation in frequency due to a change in temperature.

FIG. 4 is a diagram illustrating an example of an output frequency characteristic of the microwave oscillator. As shown in FIG. 4, in the output frequency characteristic of the microwave oscillator 10, a power peak is obtained around a frequency of 2.45 GHz. Even when output microwave power is changed, little variation occurs in the frequency.

Further, the microwave oscillator 10 has the following characteristics. The microwave oscillator 10 does not need preheating, and directly oscillates a predetermined frequency in substantially real time when power is supplied. The frequency characteristic of the microwave oscillator 10 does not vary even when microwave power increases, and little phase noise is generated.

<Schematic Structure of First Projector>

The schematic structure of the projector 100 will be described with reference to FIG. 1.

The projector 100 includes the light source device 30, the optical unit 50, the projection lens 52, a control unit 53, an image signal processing unit 54, a liquid crystal panel driving unit 55, a storage unit 56, an operating unit 57, a remote controller 58, an operation receiving unit 59, a fan driving unit 60, a temperature detecting unit 61, and a power supply 62.

The light source device 30 includes a cavity 3, a reflector 4, an amplifying unit 11, a power control unit 12, a traveling wave/reflected wave detecting unit 13, and a matching unit 14, in addition to the electrodeless lamp 1, the antenna 2, and the microwave oscillator 10. Among there, the microwave oscillator 10, the amplifying unit 11, the power control unit 12, the traveling wave/reflected wave detecting unit 13, and the matching unit 14 form a microwave circuit unit 18. The traveling wave/reflected wave detecting unit 13 may be separated into a traveling wave detecting unit and a reflected wave detecting unit.

The cavity 3 is a hollow member formed of a metal reflecting microwaves, such as aluminum. The cavity 3 concentrates microwaves radiated from the antenna 2 on the electrodeless lamp 1 and prevents the microwaves from leaking to the outside.

The reflector 4 reflects light emitted from the electrodeless lamp 1 to converge on a point and guides the light to the optical unit 50.

The amplifying unit 11 is provided in the latter stage of the microwave oscillator 10 and amplifies microwave power output from the microwave oscillator 10.

The power control unit 12 is an amplification factor adjusting circuit for adjusting the amplification factor of the amplifying unit 11 in response to a control signal output from the control unit 53.

The traveling wave/reflected wave detecting unit 13 is, for example, a directional coupler for separating a traveling wave and a reflected wave. The traveling wave/reflected wave detecting unit 13 detects traveling wave power Pf transmitted to the antenna 2 and reflected wave power Pr returning from the antenna 2 and transmits the detected signals to the control unit 53. The traveling wave/reflected wave detecting unit 13 may also have the function of an isolator, and consumes the reflected wave power as heat by using a resistor provided therein after the power is detected. In this way, it is possible to reduce the reflected wave returning from the traveling wave/reflected wave detecting unit 13 to the amplifying unit 11 to the extent that no failure occurs in the amplifying unit 11 or the microwave oscillator 10.

The matching unit 14 adjusts the impedance matching of a load in the antenna 2 on the basis of the control signal from the control unit 53.

The optical unit 50 includes an integrator illumination optical system that converts light emitted from the electrodeless lamp 1 into light having a stable brightness distribution, a separating optical system that separates the light having a stable brightness distribution into three primary color light components, that is, a red light component, a green light component, and a blue light component, and supplies the separated red, green, and blue light components to red, green, and blue liquid crystal light values 88R, 88G, and 88B, respectively, and a combining optical system that combines light components modulated by the red, green, and blue liquid crystal light values in response to image signals to generate full color modulated light. The optical system 50 will be described in detail later.

The projection lens 52 includes a zoom lens. The projection lens 52 enlarges the full color modulated light emitted from the optical unit 50 and projects the enlarged full color image onto the screen SC.

The control unit 53 is a central processing unit (CPU) and controls the projector 100 by means of communication with components including the light source device 30 through a bus line Bus.

The image signal processing unit 54 is provided with, for example, an image converter for converting analog image signals input from an external image signal supplying apparatus 350, such as a personal computer, into digital signals, a scaler (not shown), and a frame memory (not shown).

The image signal processing unit 54 converts input analog image signals, such as R, G, and B signals or components signals, into digital signals by using the image converter and performs image processing, such as scaling, on the digital image signals.

The image signal processing unit 54 writes to the frame memory an image represented by image signals at resolution of the image signals by the color lights of R, G and B, converts the image into an image having a resolution that can be displayed by the liquid crystal light values 88R, 88G, and 88B, and reads out the converted image to generate image signals suitable for the corresponding liquid crystal light values. A trapezoid correcting process for shaping an effective image projected onto the screen SC into a rectangle is performed together with the scaling process.

The liquid crystal panel driving unit 55 is a liquid crystal panel driver that supplies the image signals subjected to image processing and a driving voltage to the liquid crystal light values 88R, 88G, and 88B and outputs images to the corresponding liquid crystal light values.

The storage unit 56 is composed of a non-volatile memory, such as a mask ROM, a flash memory, or a ferroelectric memory (FeRAM). The storage unit 56 stores various programs for controlling the operation of the projector, such as a start program that defines the content and procedure for starting the projector 100, including an operation of turning on the light source device 30, and additive data.

For example, the programs include a first impedance adjusting program for allowing the matching unit 14 to adjust the impedance on the basis of the traveling wave power Pf and the reflected wave power Pr detected by the traveling wave/reflected wave detecting unit 13.

The additive data includes a first impedance adjustment table, which is a matching constant table for defining impedance adjustment values most suitable for the traveling wave power Pf and the reflected wave power Pr, data preset for the traveling wave power Pf and the reflected wave power Pr in order to determine whether the electrodeless lamp 1 is turned on, and a temperature conversion table for extracting a temperature value corresponding to temperature data from the temperature data detected by the temperature detecting unit 61.

The operating unit 57 is provided on the upper surface of the main body of the projector 100 and includes a plurality of operating buttons (not shown) for operating the projector 100. The plurality of operating buttons include a "power button" for starting or shutting down the projector 100, a "menu button" for displaying menu for various operations, and a "brightness adjusting button" for adjusting the brightness of a projected image.

The remote controller 58 is a remote controller for operating the projector 100 by remote control, and includes a plurality of operating buttons for operating the projector 100, similar to the operating unit 57.

When an operator operates the operating unit 57 or the remote controller 58, the operation receiving unit 59 receives operational signals and transmits the operational signals for triggering various operations to the control unit 53.

The fan driving unit 60 is a driving circuit for rotating a fan F1, which is an axial flow fan, in response to the control signal output from the control unit 53. The fan is not limited to the axial flow fan. For example, a Sirocco fan for concentratively supplying air around the liquid crystal light values 88R, 88G, and 88B or the cavity 3 may be further provided.

The temperature detecting unit 61 includes a thermistor Th, serving as a temperature sensor attached to the outside of the cavity 3. The temperature detecting unit 61 detects the temperature of the cavity 3 and transmits the detected temperature to the control unit 53 as temperature data. The temperature sensor may be a resistance temperature detector, a quartz crystal temperature sensor, or a thermoelectric element.

The power supply 62 is supplied with an AC voltage through an inlet from an external power source 351, converts the AC voltage into a DC voltage by using an AC/DC converter (not shown) provided therein, rectifies and smoothes the DC voltage, and supplies a stabilized DC voltage to all components of the projector 100.

<Schematic Structure of Optical Unit>

Figure 5:
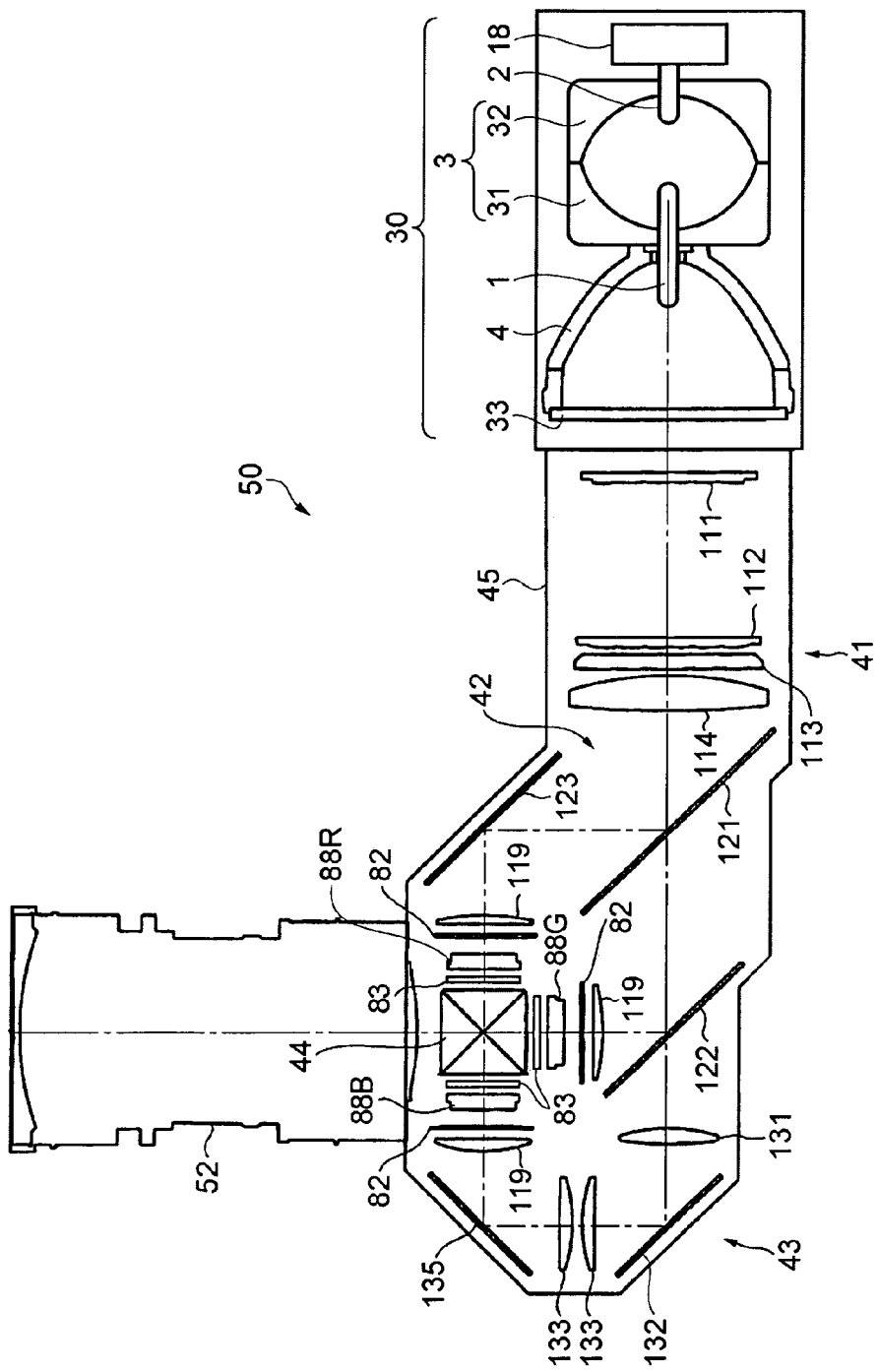
FIG. 5 is a diagram schematically illustrating the structure of a peripheral portion of an optical unit.

FIG. 5 is a diagram schematically illustrating the structure of an optical unit.

Next, a structure including an optical system of the optical device 30 will be described in detail, and the schematic structure of the optical unit 50 will also be described below.

First, the structure including the optical system of the optical device 30 will be described in detail.

The microwave output from the microwave circuit unit 18 of the optical device 30 is radiated from the antenna 2 in the cavity 3.

The cavity 3 is formed by combining members 31 and 32 having concave surfaces that are made of a metallic material reflecting microwaves such as aluminum such that the concave surfaces face each other. Any members having concave surfaces can be used as the concave members 31 and 32 as long as they can reflect microwaves. For example, concave members each formed by laminating a dielectric layer reflecting microwaves on a synthetic resin may be used as the concave members 31 and 32.

A space formed by the combination of the concave members 31 and 32 is sealed, and the antenna 2 and the electrodeless lamp 1 are provided in the space so as to be opposite to each other.

A curved surface forming the space in the cavity 3 has a sufficient curvature to concentrate microwaves radiated from the antenna 2 on the electrodeless lamp 1.

It is preferable that the protruding length of the antenna 2 in the space of the cavity 3 be a quarter ($\lambda/4$) of the wavelength $\lambda$ where the radiation efficiency of microwaves is high. Since the wavelength $\lambda$ is determined by a dielectric constant of a dielectric, it is possible to decrease the length of the antenna 2 by, for example, filling a high molecular material having a large dielectric constant in the space of the cavity. Alternatively, a helical antenna may be used to decrease the length of the antenna 2. A planar antenna may be formed on a film substrate having a large dielectric constant, and the film substrate may be attached to the concave surface of the member 32 facing the electrodeless lamp 1.

Preferably, the protruding length of the electrodeless lamp 1 to the inner surface of the cavity 3 is a quarter of the wavelength $\lambda$.

The electrodeless lamp 1 is formed in a hollow rod shape made of transmissive inorganic glass having heat resistance, such as quartz glass, and is filled with a light emitting material that is excited by a microwave to emit light by means of plasma emission. In addition, the electrodeless lamp 1 does not have electrodes.

The light emitting material filled in the electrodeless lamp 1 may be rare gas, such as neon gas, argon gas, krypton gas, or halogen gas. A metallic material, such as mercury or sodium, or a metal compound may be filled into the electrodeless lamp 1 together with the gas. In addition, the light emitting material may be a solid.

The other end of the electrodeless lamp 1 protrudes toward the center of the concave surface of the reflector 4.

The reflector 4 is formed of quartz glass and has a concave paraboloid. The paraboloid has a curvature such that the leading end of the electrodeless lamp 1 protruding toward the reflector 4 is disposed at a substantially focal point. A dielectric film for improving the reflectance of visible light is coated on the paraboloid.

The shape of the concave surface of the reflector 4 may be an ellipsoid. In this case, a collimating concave lens for substantially collimating light beams reflected from the ellipsoid is arranged.

A protective glass 33 is provided in a lid shape on the concave surface of the reflector 4, and prevents dust from entering into the electrodeless lamp 1 when the light source device 30 is detached from the projector 100 or prevents broken pieces of the electrodeless lamp 1 due to a drop from being dispersed. A dielectric film for shielding microwaves may be coated on the protective glass 33, or a metal mesh having a pitch sufficiently smaller than the wavelength $\lambda$ may be inserted into the projective glass 33.

In the light source device 30 having the above-mentioned structure, when microwaves are radiated from the antenna 2, the microwaves are concentrated on a protruding portion of the electrodeless lamp 1 in the cavity 3.

When the microwaves are concentratively radiated on the light emitting material of the electrodeless lamp 1, the light emitting material is excited, which causes plasma emission due to discharge. In this case, the light emitting material is evaporated and dissociated into particles in a high-temperature portion onto which the microwave is radiated, and then emits light by means of plasma discharge. Then, the particles move to a low-temperature portion in the light emitting body, and are then condensed to the original light emitting material. The light emitting material continuously emits light while repeating the evaporation, the dissociation, and condensation.

The light emitting portion of the electrodeless lamp 1 depends on the microwave power, but more than two thirds of the length of the electrodeless lamp 1 emit light. Therefore, light emitted from the electrodeless lamp 1 travels through the inorganic glass and the inner space so that the entire electrodeless lamp 1 emits light.

In this way, most of light is emitted from one end of the electrodeless lamp 1 protruding toward the concave surface of the reflector 4 and is then concentrated by the paraboloid of the reflector 4. Then, the light is emitted to the optical unit 50 as substantially parallel light beams.

The light source device 30 is composed of a single unit, and thus can be easily assembled or disassembled.

Subsequently, the schematic structure of the optical unit 50 will be described.

The optical unit 50 includes an integrator illumination optical system 41, a color separating optical system 42, a relay optical system 43, the liquid crystal light values 88R, 88G, and 88B, and a combining optical device 44.

The components of the optical unit 50 are integrally provided in an optical part case 45 as a unit.

The integrator illumination optical system 41 is an optical system that uniformizes the illuminance of the light beams emitted from the light source device 30 on the plane orthogonal to the optical axis direction of the light beam (which is represented by a one-dot chain line). The integrator illumination optical system 41 includes a first lens array 111, a second lens array 112, a polarizing element 113, and a superimposing lens 114.

The first lens array 111 includes small lenses that are arranged in a matrix, and each of the small lenses has a substantially rectangular shape as viewed from the optical axis direction of the light beam. Each small lens divides a light beam emitted from the light source device 30 into partial light beams and emits the partial light beams in the optical axis direction thereof.

The second lens array 112 has substantially the same structure as the first lens array 111, and includes small lenses that are arranged in a matrix. The second lens array 112 superimposes the light beams having passed through the small lenses of the first lens array 111 on the liquid crystal light valves 88R, 88G, and 88B together with the superimposing lens 114, thereby making the illuminance of the light beams uniform.

The polarizing element 113 is an optical element that converts light having two types of polarized components emitted from the electrodeless lamp 1 as the main components into one type of polarized light that can be modulated by the liquid crystal light valves 88R, 88G, and 88B.

More specifically, light including two types of polarized components that has passed through the second lens array 112 is converted into one type of polarized light by the polarizing element 113 and finally is substantially superimposed on the liquid crystal light valves 88R, 88G, and 88B by the superimposing lens 114.

In this case, the polarized light accounting for about 50% of all light beams is converted into polarized light that can be modulated by the liquid crystal light values by the polarizing element 113, which makes it possible to improve the usage efficiency of light. When the polarizing element 113 is not provided, the polarized light accounting for about half the light beams is consumed as heat.

The color separating optical system 42 includes two dichroic mirrors 121 and 122 and a reflecting mirror 123. A plurality of partial light beams emitted from the integrator illumination optical system 41 are separated into three light beams, that is, red (R), green (G), and blue (B) light components by the two dichroic mirrors 121 and 122.

The dichroic mirror 121 is an optical element including a dielectric multi-layer film that transmits the green light component and the blue light component but reflects the red light component.

The dichroic mirror 121 transmits the green light component and the blue light component, but reflects the red light component among light beams emitted from the integrator illumination optical system 41. The reflected red light component is also reflected from the reflecting mirror 123 to be incident on the red liquid crystal light valve 88R through a field lens 119.

The field lens 119 converts the partial light beams passing through the second lens array 112 into light beams parallel to the central axis (main light beam) thereof. The field lenses 119 provided on the incident sides of the blue and green liquid crystal light valves 88B and 88G functions similarly.

The dichroic mirror 122 is an optical element including a dielectric multi-layer film that transmits the blue light component but reflects the green light component.

The dichroic mirror 122 reflects the green light component of the blue light component and the green light component passing through the dichroic mirror 121. The reflected green light component is incident on the green liquid crystal light valve 88G through the field lens 119.

The blue light component passing through the dichroic mirror 122 is incident on the blue liquid crystal light valve 88B through the relay optical system 43 and the field lens 119.

The relay optical system 43 includes an incident-side lens 131, a pair of relay lenses 133, and reflecting mirrors 132 and 135. The relay optical system 43 guides the blue light component separated by the color separating optical system 42 to the blue liquid crystal light valve 88B.

The relay optical system 43 is used for the blue light component in order to prevent a reduction in the usage efficiency of light due to the scattering of light, since the length of the optical path of the blue light component is larger than those of the other light components. That is, the relay optical system is used for the blue light component in order to transmit the partial light beam incident on the incident-side lens 131 to the field lens 119. In this embodiment, the relay optical system 43 transmits the blue light component among the three light components, but the invention is not limited thereto. For example, the relay optical system 43 may transmit the red light component by changing the functions of the dichroic mirrors 121 and 122.

Incident-side polarizing plates 82 on which the light components separated by the color separating optical system 42 are incident are provided on the incident sides of the liquid crystal light valves 88R, 88G, and 88B, and emission-side polarizing plates 83 are provided on the emission sides of the liquid crystal light valves 88R, 88G, and 88B.

The incident-side polarizing plates 82 and the emission-side polarizing plates 83 transmit light components polarized in a predetermined direction among the light beams separated by the color separating optical system 42 and absorb the other light beams. Each of the polarizing plates is formed of a laminate of a substrate made of sapphire glass or the like and a polarizing film formed on the substrate.

Each of the liquid crystal light valves 88R, 88G, and 88B uses polysilicon thin film transistors (TFTs) as switching elements, and includes a pair of transparent substrates opposite to each other and a liquid crystal layer interposed therebetween.

The liquid crystal light valves 88R, 88G, and 88B, which are transmissive liquid crystal panels, modulate the red, green, and blue light components incident thereon through the incident-side polarizing plates 82 according to red, green, and blue image information and emit the modulated red, green, and blue light components through the corresponding emission-side polarizing plates 83.

The combining optical system 44 is a cross dichroic prism that combines the modulated red, green, and blue light components emitted from the corresponding emission-side polarizing plates 83 and emits modulated light indicating a full color image.

In the cross dichroic prism 44, the dielectric multi-layer film for reflecting the red light component and the dielectric multi-layer film for reflecting the blue light component are provided in an X shape along the interfaces among four right-angled prisms, and the dielectric multi-layer films combine the three light components.

The modulated light combined by the cross dichroic prism 44 is enlarged by the projection lens 52 and is then projected onto the screen SC.

The liquid crystal light valves 88R, 88G, and 88B, the three emission-side polarizing plates 83, and the cross dichroic prism 44 are integrated into one unit.

<Process of Turning on Light Source Device>

Figure 6:
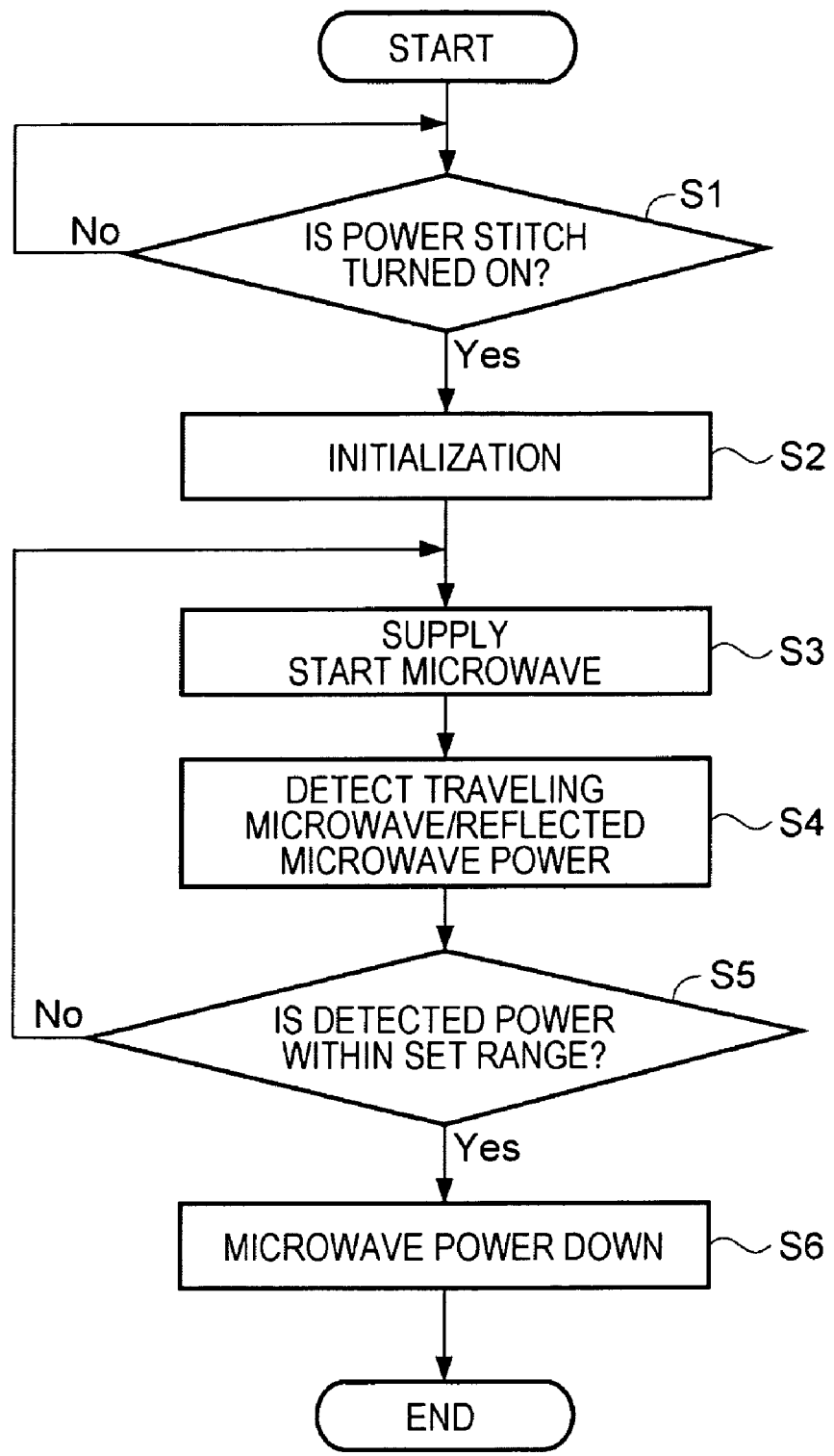
FIG. 6 is a flow chart illustrating the flow of a process of turning on an optical device.
Figure 7:
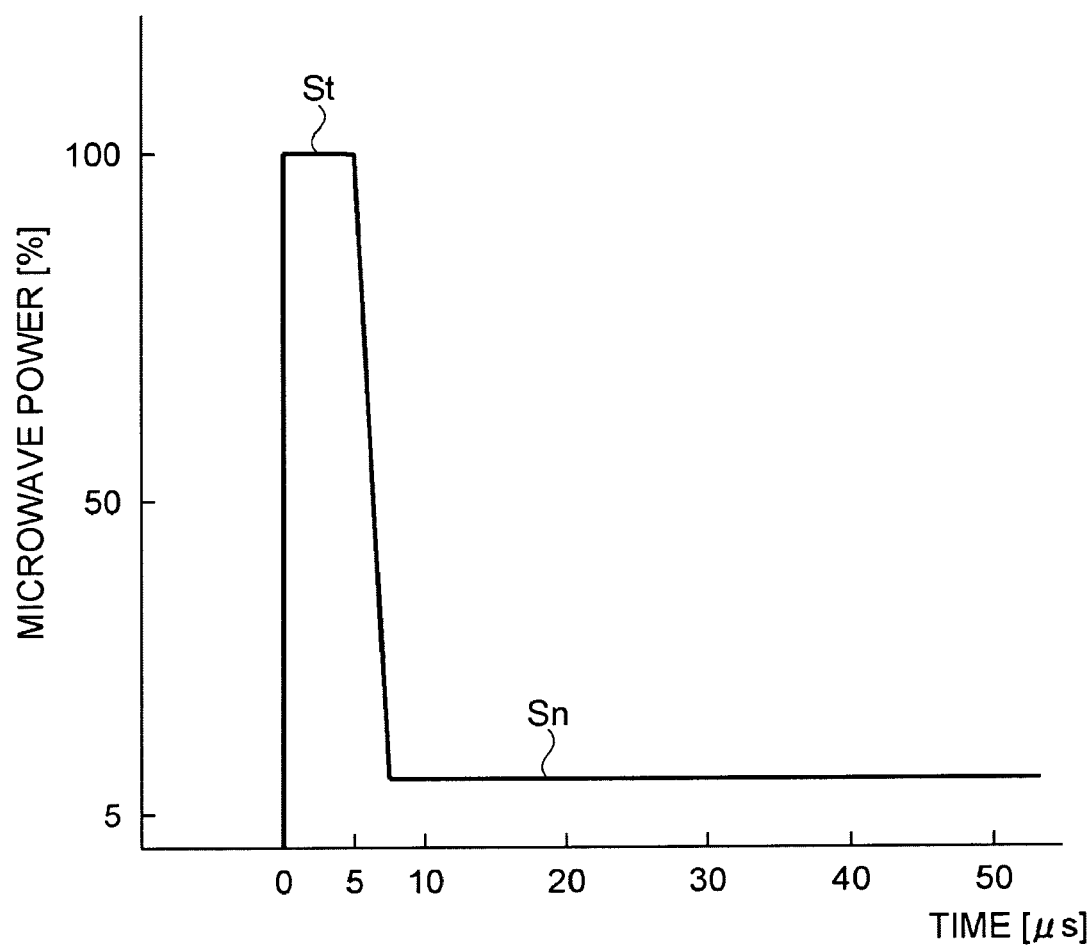
FIG. 7 is a timing chart illustrating the change of microwave power in the process of turning on the optical device.

FIG. 6 is a flow chart illustrating the flow of a process of turning on an optical device. FIG. 7 is a timing chart illustrating a change of microwave power in the process of turning on the optical device.

Next, a process of turning on the optical device 30 of the projector 100 will be described with reference to FIG. 6 mainly in association with FIGS. 1 and 7.

A plug extending from the power supply 62 is put in an outlet (not shown) and the projector 100 is in a standby state.

In step S1, the control unit 53 checks whether the operating unit 57 or the remote controller 58 is operated according to whether an operational signal is received from the operation receiving unit 59. When the operating unit 57 or the remote controller 58 is operated, the process proceeds to step S2. On the other hand, when the operating unit 57 or the remote controller 58 is not operated, the control unit 53 is kept in the standby state.

In step S2, since the operating unit 57 or the remote controller 58 is operated, the control unit 53 executes a first starting program stored in the storage unit 56 to initialize all components. It takes about one second to initialize the components. The operations of all components in the following steps are defined by the first starting program.

In step S3, the control unit 53 controls the microwave oscillator 10 to output microwaves and controls the power control unit 12 to adjust the amplification factor of the amplifying unit 11 to output a microwave power St having the pulse form shown in FIG. 7 to the antenna 2. The microwave power St is supplied for about 5 μs to excite the light emitting material of the electrodeless lamp 1, thereby starting plasma emission.

In step S4, the control unit 53 controls the traveling wave/reflected wave detecting unit 13 to detect the traveling wave power Pf and the reflected wave power Pr.

In step S5, the control unit 53 compares the detected traveling wave power Pf and reflected wave power Pr with the set data stored in the storage unit 56. When the detected power is within the set data range, the process proceeds to step S6. When the detected power is beyond the set data range, the process proceeds to step S3 to output the microwave power St again.

When a traveling microwave is radiated, the reflected wave power Pr is necessarily generated though a level difference occurs. Therefore, the ranges of the traveling wave power Pf and the reflected wave power Pr when the electrodeless lamp 1 normally emits light may be stored in the storage unit 56 beforehand as the set data, and the on/off state of the electrodeless lamp 1 may be checked from the values of the detected traveling wave power Pf and reflected wave power Pr. The set data may be differential data obtained by subtracting the value of the reflected wave power Pr from the value of the traveling wave power Pf.

In step S6, the control unit 53 controls the power control unit 12 to adjust the amplification factor of the amplifying unit 11 and to output a microwave power Sn shown in FIG. 7 from the antenna 2.

The first starting program ends in step S6, and at the same time the first impedance adjusting program stored in the storage unit 56 is executed.

<Process of Adjusting Brightness of Light Source Device>

Figure 8:
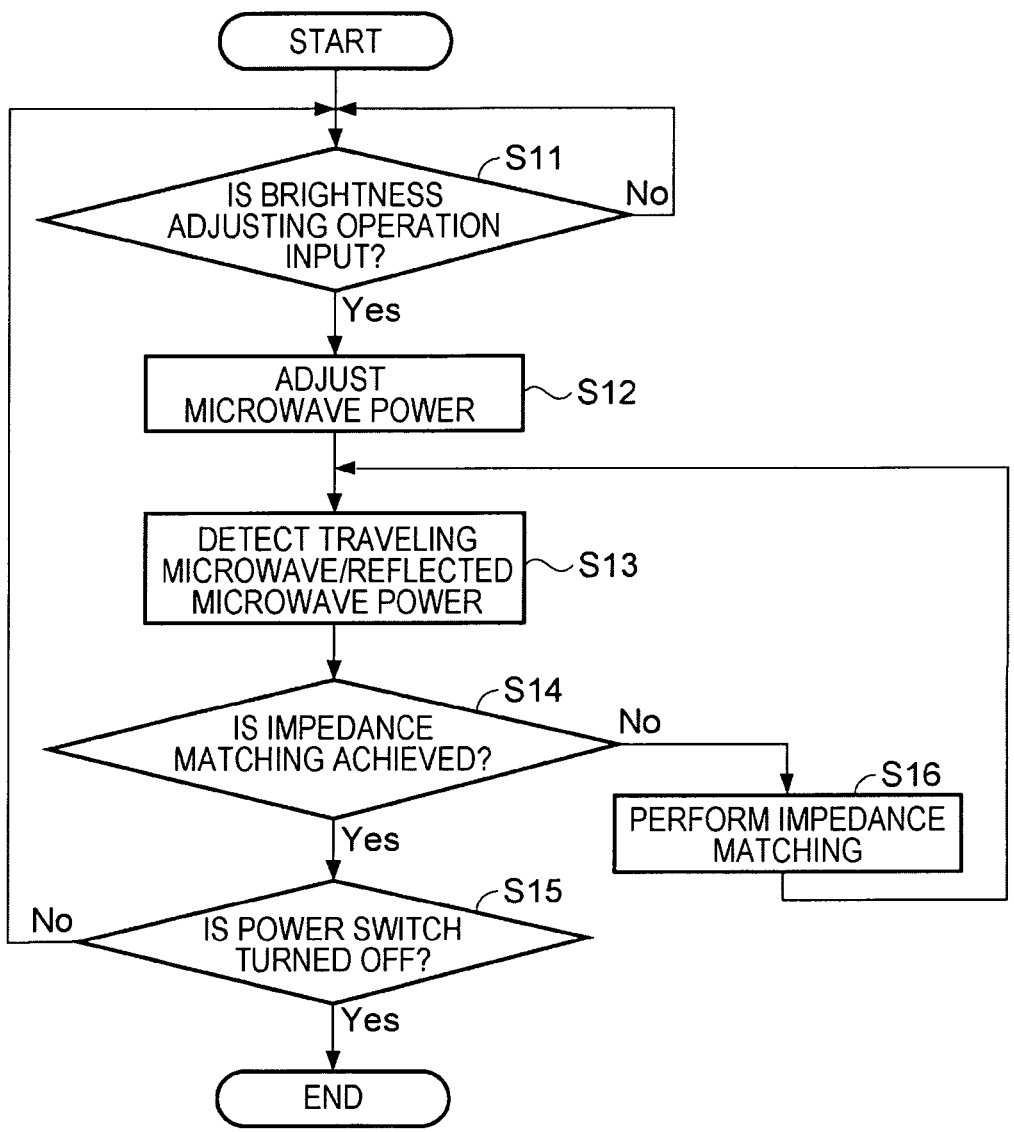
FIG. 8 is a flow chart illustrating the flow of a brightness control process of the optical device.
Figure 9:
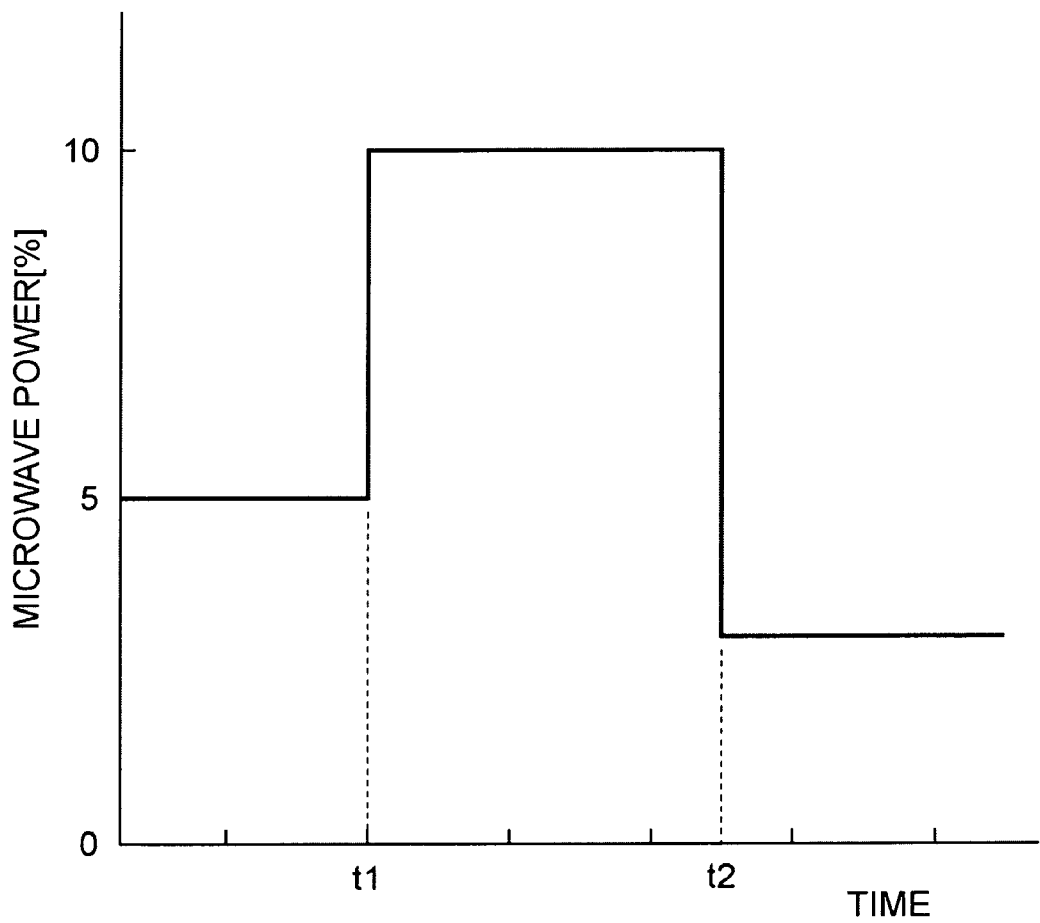
FIG. 9 is a timing chart illustrating the change of microwave power in the brightness control process of the optical device.

FIG. 8 is a flow chart illustrating a process of adjusting the brightness in an optical device. FIG. 9 is a timing chart illustrating a change of microwave power in the process of adjusting the brightness in the optical device.

Next, the process of adjusting the brightness in the optical device 30 of the projector 100 will be described with reference to FIG. 8 mainly in association with FIGS. 1 and 9.

The projector 100 projects on the screen an image corresponding to image signals output from the image signal supplying device 350 with an initial brightness value.

In step S11, the control unit 53 checks whether the operating unit 57 or the remote controller 58 is operated for adjusting the brightness of light according to whether an operational signal is received from the operation receiving unit 59. When the operating unit 57 or the remote controller 58 is operated for adjusting the brightness of light, the process proceeds to step S12. On the other hand, when the operating unit 57 or the remote controller 58 is not operated for adjusting the brightness of light, the control unit 53 is kept in a standby state. The first impedance adjusting program triggers an operation of adjusting the brightness of light, and executes the following steps.

In step S12, the control unit 53 controls the power control unit 12 to adjust the amplification factor of the amplifying unit 11 according to the brightness adjusting operation and to output a microwave having the adjusted amount of power from the antenna 2. An example of this state is timings t1 and t2 shown in FIG. 9.

When the microwave power varies, a load balance of the antenna 2 is broken, which makes it difficult to obtain necessary brightness even when the brightness adjusting operation is performed. The microwave not having being converted into light is changed to heat, which may cause the electrodeless lamp 1 and the cavity 3 to be deteriorated.

In step S13, the control unit 53 controls the traveling wave/reflected wave detecting unit 13 to detect the traveling wave power Pf and the reflected wave power Pr.

In step S14, the control unit 53 compares the detected traveling wave power Pf and reflected wave power Pr with the first impedance adjustment table stored in the storage unit 56 and checks whether the matching of the load impedance of the antenna 2 is achieved. When the impedance matching is achieved, the process proceeds to step S15. On the other hand, when the impedance matching is not achieved, the process proceeds to step S16.

In step S15, the control unit 53 checks whether a shutdown operation (an operation of turning off power) is input to the operating unit 57 or the remote controller 58 according to whether an operational signal is received from the operation receiving unit 59. When the shutdown operation is input, the control unit 53 shuts down the first impedance adjusting program. When the shutdown operation is not input, the control unit 53 proceeds to step S11 to wait for the input of the brightness adjusting operation.

Next, a process when the matching of the load impedance of the antenna 2 is not achieved in step S14 will be described below.

In step S16, the control unit 53 extracts an optimal impedance adjustment value from the first impedance adjustment table and sets the extracted value to the matching unit 14. The matching unit 14 adjusts impedance matching on the basis of the set adjustment value.

The checking and adjustment of impedance matching in steps S13 to S16 may be performed every a predetermined period of time (for example, 3 minutes) after the electrodeless lamp 1 is turned on. In addition, the checking and adjustment may be performed on the basis of the temperature detected by the temperature detecting unit.

As described above, according to this embodiment, the following effects are obtained.

(1) The microwave oscillator 10 is a diamond SAW oscillator provided with a diamond SAW resonator. Therefore, the microwave oscillator 10 generates microwaves immediately after being supplied with power and thus can rapidly turn on the electrodeless lamp 1. In addition, the microwave oscillator 10 has a small size, high power resistance, and a small variation in frequency although the temperature varies.

The microwave oscillated by the microwave oscillator 10 is amplified by the amplifying unit 11 and is then radiated from the antenna 2 provided in the cavity 3. Therefore, the microwave is kept in the cavity 3.

Therefore, the microwave does not leak to the outside of the cavity 3, which makes it possible to prevent the microwave from having an adverse effect on medical instruments or wireless communication apparatuses, such as WLAN, Home RF, Zigbee ® and Bluetooth ® used in an ISM band.

Further, the power control unit 12 adjusts the amplification factor of the amplifying unit 11 for microwaves such that the microwave power St having a pulse form that is higher than the microwave power radiated to keep the electrodeless lamp 1 emitting light is radiated to turn on the electrodeless lamp 1. Therefore, a microwave having predetermined power is radiated to the electrodeless lamp 1 at once.

Then, the light emitting material of the electrodeless lamp 1 is excited, and plasma emission starts. Thus, it is possible to reliably turn on the light emitting body.

The microwave oscillator 10 outputs microwaves with a peak microwave power at a predetermined frequency. Even when the microwave power increases, the frequency characteristic of the microwave does not vary. In addition, since the power control unit 12 can adjust the amplification factor of the amplifying unit 11, the electrodeless lamp 1 emits light having substantially the same spectrum according to the microwave power.

Therefore, it is possible to adjust the quantity of light without changing the emission spectrum of the electrodeless lamp 1.

As a result, it is possible to provide the projector 100 including the light source device 30 capable of being rapidly and reliably turned on and stably obtaining a predetermined amount of light.

(2) The traveling wave/reflected wave detecting unit 13 is provided in the latter stage of the amplifying unit 11. The traveling wave/reflected wave detecting unit 13 prevents some of the microwaves that have been radiated from the antennas 2 and reflected in the cavity 3 from returning to the antenna 2 and thus prevents the reflected microwave from reaching the amplifying unit 11.

Therefore, the traveling wave/reflected wave detecting unit 13 serves as an isolator for protecting the amplifying unit 11 and the microwave oscillator 10 from the reflected microwave.

As a result, it is possible to provide the projector 100 using the light source device 30 having a stable operation.

(3) The control unit 53 controls the matching unit 14 to adjust the impedance such that the reflected wave power detected by the traveling wave/reflected wave detecting unit 13 is reduced. In this way, the transmission efficiency of power with matched impedance is improved, and the conversion efficiency of the traveling microwave into light is improved.

Thus, it is possible to convert the traveling microwave into light with high energy efficiency.

As a result, it is possible to provide the projector 100 using the light source device 30 capable of obtaining a desired quantity of light with high efficiency.

(4) When the traveling wave/reflected wave detecting unit 13 detects the traveling microwave power and the reflected microwave power, the control unit 53 extracts adjustment values corresponding to the detected microwave power from the impedance adjustment table and sets the adjustment values to the matching unit 14. Therefore, adjustment values most suitable for achieving the impedance matching that is determined on the basis of, for example, design data or experimental data are set in the matching unit 14.

In this way, the transmission efficiency of power with matched impedance is improved, and the conversion efficiency of the traveling microwave into light is improved.

Thus, it is possible to convert the traveling microwave into light with high energy efficiency. As a result, it is possible to provide the projector 100 using the light source device 30 capable of obtaining a desired quantity of light with high efficiency.

(5) The projector 100 includes the light source device 30 capable of obtaining a desired amount of light including a spectrum required to obtain a clear projected image with high energy efficiency and the liquid crystal light valves 88R, 88G, and 88B each of which converts light emitted from the light source device 30 into modulated light having a clear color in response to image signals.

As a result, according to this embodiment of the invention, it is possible to provide the projector 100 capable of obtaining a clear projected image.

Second Embodiment

<Outline of Second Projector>

Figure 10:
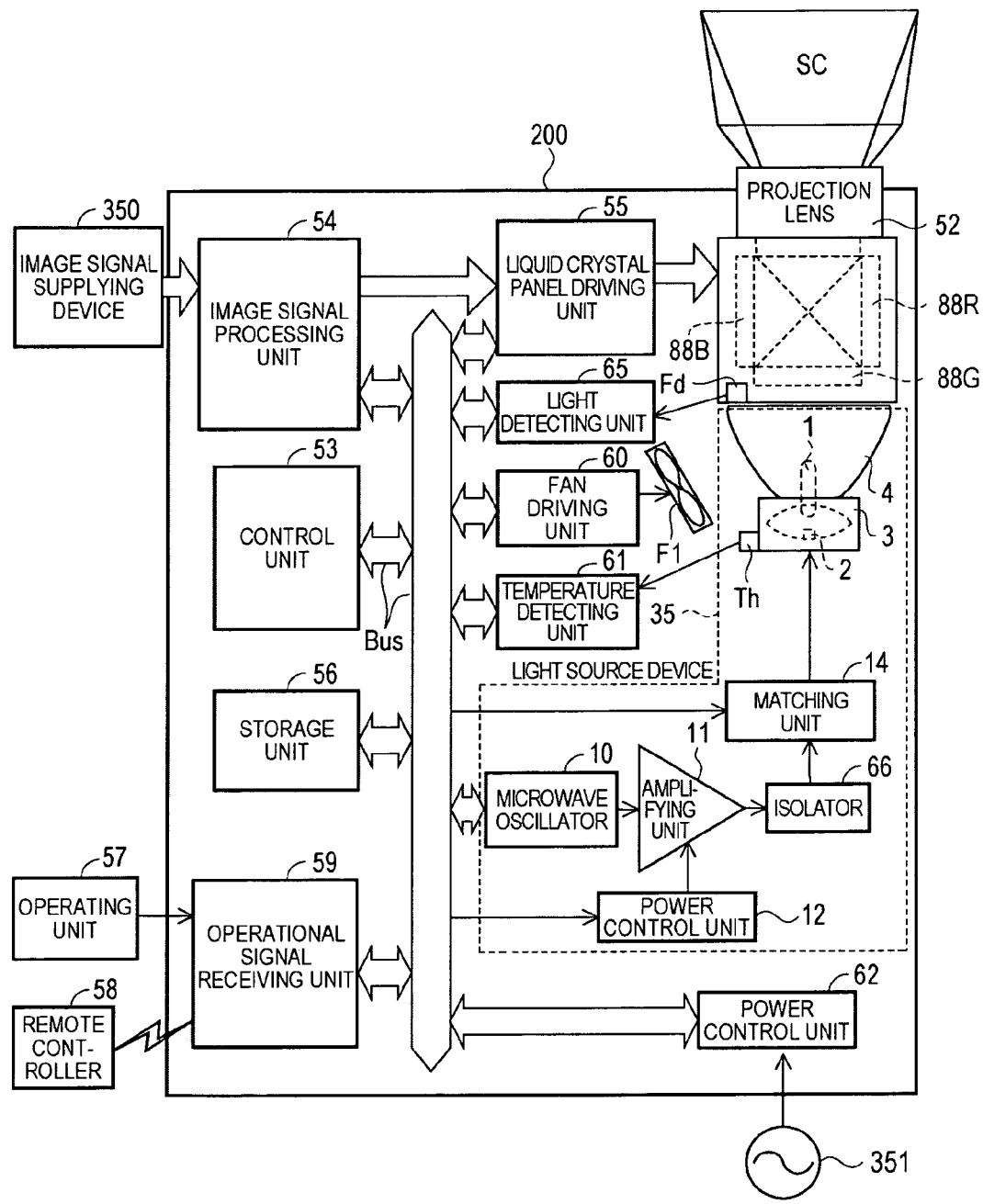
FIG. 10 is a diagram schematically illustrating the structure of a projector according to a second embodiment of the invention.

FIG. 10 is a diagram schematically illustrating the structure of a projector according to a second embodiment of the invention.

A projector 200 according to the second embodiment is similar to the projector 100 according to the first embodiment except for the following three points.

First, the projector 200 includes a light detecting unit 65.

Second, the light source device 35 of the projector 200 is provided with an isolator 66 instead of the traveling wave/reflected wave detecting unit 13 (FIG. 1).

Third, a storage unit 56 of the projector 200 stores programs and data and some of the programs and data are different from those in the projector 100.

In the second embodiment, the same components as those in the projector 100 according to the first embodiment have the same reference numerals, and the schematic structure of the projector 200 will be described, centered on the above-mentioned three different points.

The light detecting unit 65 includes a photodiode Fd, serving as an optical sensor capable of detecting light emitted from the electrodeless lamp 1, that is attached on the surface of a protective glass 33 (FIG. 5). The light detecting unit 65 detects the quantity of light emitted from the electrodeless lamp 1 and transmits data for the quantity of light to the control unit 53. The optical sensor may be, for example, a phototransistor or a CdS cell.

The isolator 66 of the light source device 35 separates the reflected wave returning from the antenna 2 and consumes the reflected wave as heat by using a resistor provided therein. In this way, the isolator 66 prevents the reflected wave from reaching the amplifying unit 11.

The storage unit 56 stores various programs for controlling the operation of the projector, such as a second start program that defines the content and procedure for starting the projector 200, including an operation of turning on the light source device 35, and additive data.

For example, the programs include a second impedance adjusting program for allowing the matching unit 14 to adjust the impedance on the basis of the data for the quantity of light detected by the light detecting unit 65.

The additive data includes a predetermined light quantity value previously set to determine whether the electrodeless lamp 1 is turned on, a second impedance adjustment table, which is a matching constant table for defining an impedance adjustment value most suitable for the data for the quantity of light, and a limited temperature that is determined as an inappropriate temperature to turn on the electrodeless lamp 1. The limited temperature may be about 1000° C. at which the electrodeless lamp 1 may be damaged.

When the same microwave is radiated, the adjustment value of the second impedance adjustment table is set such that the quantity of light detected by the light detecting unit 65 increases.

<Process of Turning on Light Source Device>

Figure 11:
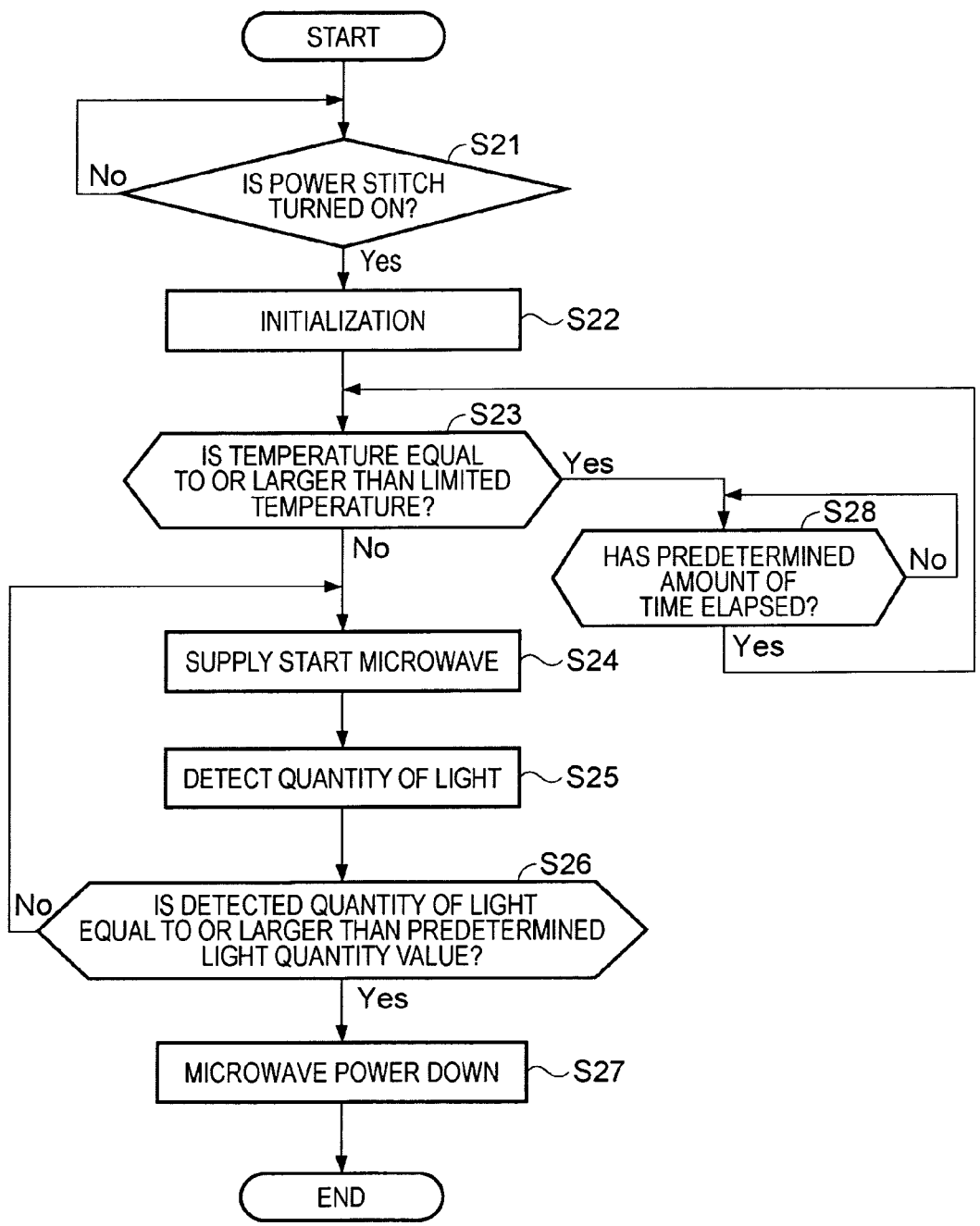
FIG. 11 is a flow chart illustrating the flow of a process of turning on an optical device.

FIG. 11 is a flow chart illustrating the flow of a process of turning on an optical device.

The process of turning on the optical device 35 of the projector 200 will be described with reference to FIG. 11 mainly in association with FIGS. 7 and 10.

A plug extending from the power supply 62 is put in an outlet (not shown) and the projector 200 is in a standby state.

In step S21, the control unit 53 checks whether the operating unit 57 or the remote controller 58 is operated for starting according to whether an operational signal is received from the operation receiving unit 59. When the operating unit 57 or the remote controller 58 is operated for starting, the process proceeds to step S22. On the other hand, when the operating unit 57 or the remote controller 58 is not operated for starting, the control unit 53 is kept in the standby state.

In step S22, when the operating unit 57 or the remote controller 58 is operated for starting, the control unit 53 executes the second starting program stored in the storage unit 56 to initialize all components. It takes about one second to initialize the components. The operations of all components in the following steps are defined by the second starting program.

In step S23, the control unit 53 checks whether the temperature value detected by the temperature detecting unit 61 is equal to or larger than the limited temperature. When the detected temperature value is equal to or larger than the limited temperature, the control unit 53 controls the fan driving unit 60 to rotate at the maximum rotational speed, and proceeds to step S28. On the other hand, when the detected temperature value is smaller than the limited temperature, the control unit 53 proceeds to step S24.

In step S24, the control unit 53 controls the microwave oscillator 10 to output microwaves and controls the power control unit 12 to adjust the amplification factor of the amplifying unit 11 to output a microwave power St having the pulse form shown in FIG. 7 from the antenna 2. The microwave power St is supplied for about 5 μs to excite the light emitting material of the electrodeless lamp 1, thereby starting plasma emission.

In step S25, the control unit 53 controls the light detecting unit 65 to detect the quantity of light.

In step S26, the control unit 53 compares the detected quantity of light with the predetermined light quantity value stored in the storage unit 56. When the detected quantity of light is equal to or larger than the predetermined light quantity value, the process proceeds to step S27. On the other hand, when the detected quantity of light is smaller than the predetermined light quantity value, the process proceeds to step S24.

In step S27, the control unit 53 controls the power control unit 12 to adjust the amplification factor of the amplifying unit 11 and to output the microwave power Sn shown in FIG. 7 from the antenna 2.

The second starting program ends in step S27, and the second impedance adjusting program stored in the storage unit 56 becomes resident.

Next, a process when the temperature detected in step S23 is equal to or larger than the limited temperature will be described below.

In step S28, the control unit 53 checks whether a predetermined amount of time (for example, one minute) has elapsed. When the predetermined amount of time has elapsed, the process proceeds to step S23. On the other hand, when the predetermined amount of time has not elapsed, the control unit 53 controls the temperature detecting unit 61 to detect the temperature after the predetermined amount of time has elapsed, and proceeds to step S24 according to the detected temperature. Alternatively, the control unit 53 may perform a process of setting a predetermined cooling time.

<Process of Adjusting Brightness in Light Source Device>

Figure 12:
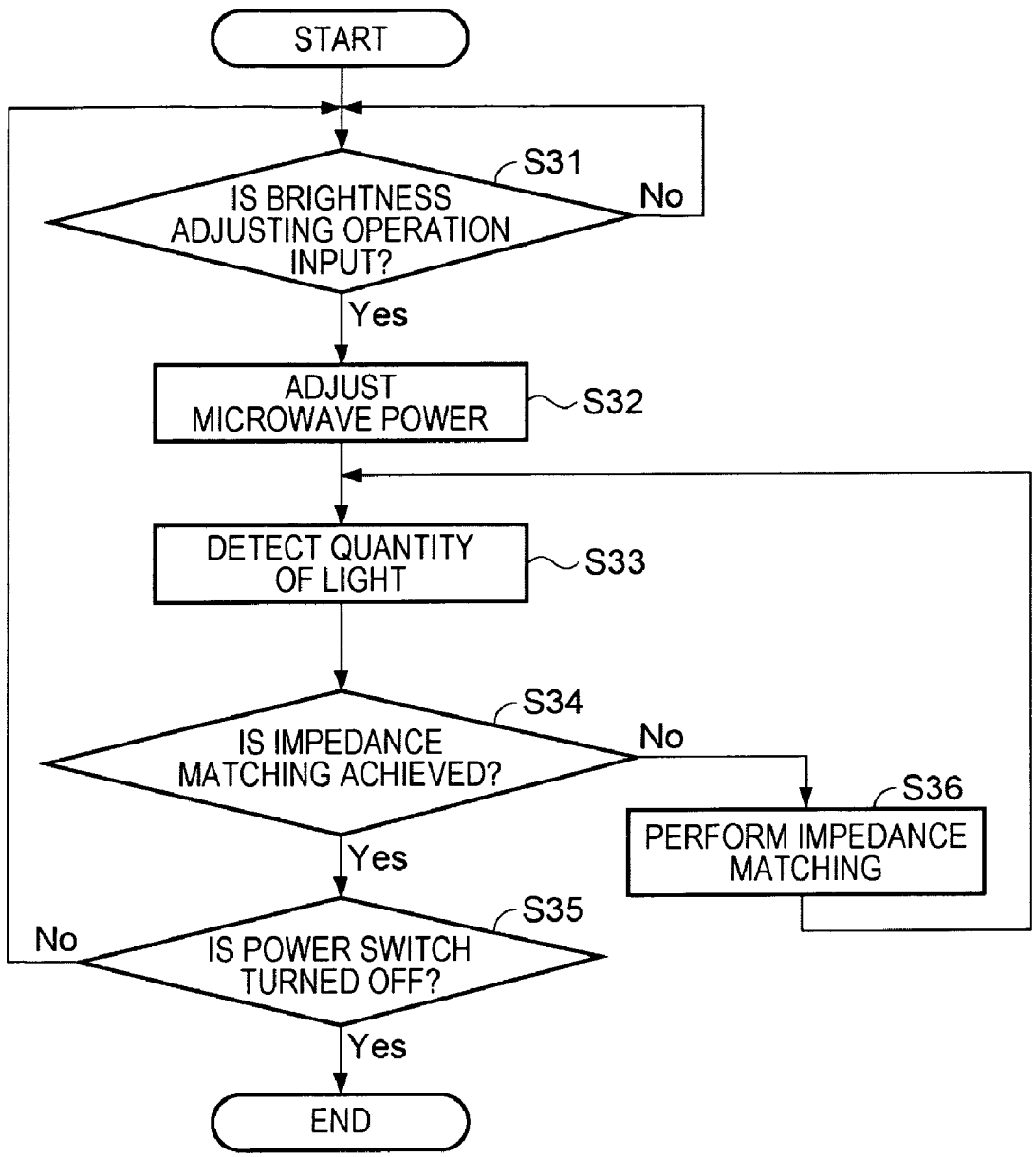
FIG. 12 is a flow chart illustrating the flow of a brightness control process of the optical device.
Figure 13:
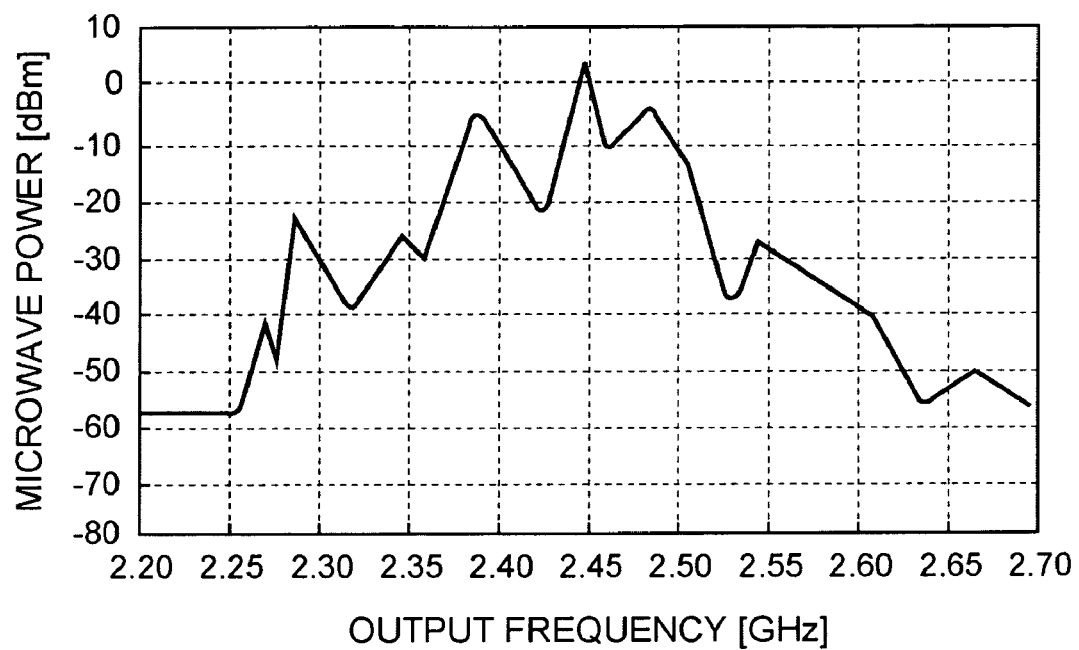
FIG. 13 is a diagram illustrating a frequency characteristic of microwaves generated by a magnetron.

FIG. 12 is a flow chart illustrating the flow of a process of adjusting the brightness in an optical device.

Next, the process of adjusting the brightness of light in the optical device 35 of the projector 200 will be described with reference to FIG. 12 mainly in association with FIGS. 9 and 10.

The projector 200 projects on the screen an image corresponding to image signals output from the image signal supplying device 350 with an initial brightness value.

In step S31, the control unit 53 checks whether the operating unit 57 or the remote controller 58 is operated for adjusting brightness light according to whether an operational signal is received from the operation receiving unit 59. When the operating unit 57 or the remote controller 58 is operated for adjusting brightness light, the process proceeds to step S32. On the other hand, when the operating unit 57 or the remote controller 58 is not operated for adjusting brightness light, the control unit 53 is kept in a standby state. The second impedance adjusting program triggers an operation of adjusting the brightness of light, and executes the following steps.

In step S32, the control unit 53 controls the power control unit 12 to adjust the amplification factor of the amplifying unit 11 according to the brightness adjusting operation and to output a microwave having the adjusted amount of power from the antenna 2. An example of this state is timings t1 and t2 shown in FIG. 9.

In step S33, the control unit 53 controls the light detecting unit 65 to detect the quantity of light.

In step S34, the control unit 53 compares the detected quantity of light with the second impedance adjustment table stored in the storage unit 56 and checks whether the matching of the load impedance of the antenna 2 is achieved. When the impedance matching is achieved, the process proceeds to step S35. On the other hand, when the impedance matching is not achieved, the process proceeds to step S36.

In step S35, the control unit 53 checks whether a shutdown operation (an operation of turning off power) is input to the operating unit 57 or the remote controller 58 according to whether an operational signal is received from the operation receiving unit 59. When the shutdown operation is input, the control unit 53 shuts down the second impedance adjusting program. When the shutdown operation is not input, the control unit 53 proceeds to step S31 to wait for the input of the brightness adjusting operation.

Next, a process when the matching of the load impedance of the antenna 2 is not achieved in step S34 will be described below.

In step S36, the control unit 53 extracts an optimal impedance adjustment value from the second impedance adjustment table and sets the extracted value to the matching unit 14. The matching unit 14 adjusts impedance matching on the basis of the set adjustment value, and the process returns to step S33.

The checking and adjustment of impedance matching in steps S33 to S36 may be performed every a predetermined period of time (for example, 5 minutes) after the electrodeless lamp 1 is turned on. In addition, the checking and adjustment of impedance matching in steps S33 to S36 may be performed on the basis of the temperature detected by the temperature detecting unit.

As described above, according to this embodiment, the following effects are obtained.

(1) The control unit 53 controls the matching unit 14 to adjust impedance on the basis of the adjustment value in the second impedance adjustment table that is set such that the quantity of light detected by the light detecting unit 65 becomes larger, when the microwave power is the same.

In this way, impedance matching is achieved such that the efficiency of the conversion of a traveling microwave into light is improved.

As a result, it is possible to provide the projector 200 using the light source device 35 capable of obtaining a desired amount of light with a high degree of efficiency.

(2) The control unit 53 controls the temperature detecting unit 61 to detect the temperature before an operation of turning on the electrodeless lamp 1. When the detected temperature is equal to or larger than a predetermined limited temperature inappropriate for the operation of turning on the electrodeless lamp 1, the control unit 53 does not perform the lighting of the electrodeless lamp 1. Therefore, when the temperature of the electrodeless lamp 1 is not smaller than the limited temperature, the operation of turning on the electrodeless lamp 1 is not performed.

Therefore, the operation of turning on the electrodeless lamp 1 is performed under stable conditions, that is, at a temperature where the electrodeless lamp 1 can be reliably turned on. In addition, the electrodeless lamp 1 does not deteriorate.

As a result, it is possible to provide the projector 200 using the light source device 35 capable of being reliably turned on under stable conditions.

The invention is not limited to the above-described embodiments, but the following modifications of the invention can be made without departing from the scope and spirit of the invention.

(First Modification)

A first modification will be described with reference to FIG. 5. In the above-described embodiments, the light source device 30 or the light source device 35 is provided in the projector, but the invention is not limited thereto.

For example, since the light source device 30 is rapidly and reliably turned on, can stably obtain a desired quantity of light, and has a small size and a light weight, it may be applied to illuminating devices for airplanes, ships, and vehicles and interior illuminating devices.

(Second Modification)

A second modification will be described with reference to FIG. 5. In the second embodiment, the projector 100 is a projector of a three-liquid-crystal-panel type that uses three liquid crystal light valves 88R, 88G, and 88B as light modulating devices, but the invention is not limited thereto.

For example, the projector may use as a light modulating device a single liquid crystal light valve that has red, green, and blue color filters arranged in a matrix and emits full-color modulated light. Alternatively, the projector may use a reflective liquid crystal display device or a tilt mirror device as a light modulating device. For example, when the tilt mirror device is used, the incident-side polarizing plate 82, the emission-side polarizing plate 83, and the polarizing element 113 are not needed. Therefore, the structure of an optical unit is different from that shown in FIG. 5 according to a light modulating device used.

A rear projector including the above-mentioned light modulating device and a screen may be used.

These structures also make it possible to obtain the same effects as described in the embodiments.

As described above, according to the invention, a solid-state high frequency oscillator generates microwaves immediately after being supplied with power, unlike a magnetron requiring preheating, which is a kind of vacuum tube. Therefore, it is possible to provide a projector capable of rapidly turning on a light emitting device and a method of turning on a light source device of the projector.

The invention claimed is:

1. A projector for projecting an image on the basis of image information, comprising:
a light source device that is used as a light source for the projected image and includes:
a solid-state high-frequency oscillator that generates microwaves;
an amplifying unit that amplifies the microwaves output from the solid-state high-frequency oscillator;
a light emitting body that has a material emitting light by the microwaves filled therein; and
a power control unit that adjusts an amplification factor of the amplifying unit for the microwave,
wherein the power control unit adjusts the amplification factor of the amplifying unit such that microwave power having a pulse form that is higher than the microwave power radiated to keep the light emitting body emitting light is radiated to the light emitting body to turn on the light emitting body,
wherein the light source device further includes:
an antenna that radiates the microwaves amplified by the amplifying unit; and
a sealed hollow cavity that has at least a portion of the antenna and the light emitting body accommodated therein, and
an inner surface of the hollow cavity is a curved surface that reflects the microwaves radiated from the antenna to be concentrated on the light emitting body.

2. The projector according to claim 1,
wherein the light source device further includes an isolator provided between the amplifying unit and the antenna and prevents some of the microwaves that have been radiated from the antenna and reflected from the inner surface of the hollow cavity from returning to the antenna.

3. The projector according to claim 1, further comprising:

a traveling wave detecting unit provided between the amplifying unit and the antenna to detect traveling microwave power traveling toward the antenna;

a reflected wave detecting unit provided between the amplifying unit and the antenna to detect reflected microwave power; and a matching unit provided at least one of:
   between the traveling wave detecting unit and the antenna; and
   between the reflected wave detecting unit and the antenna, the matching unit to adjust impedance matching between an amplifying unit side and an antenna side, wherein a control unit controlling at least a start operation of the projector controls the matching unit to adjust impedance such that the reflected microwave power detected by the reflected wave detecting unit is approximately zero.

4. The projector according to claim 1, further comprising:

a control unit that controls at least a start operation of the projector; and a storage unit, wherein the light source device further includes:

a traveling wave detecting unit that is provided between the amplifying unit and the antenna to detect traveling microwave power traveling toward the antenna;

a reflected wave detecting unit that is provided between the amplifying unit and the antenna to detect the reflected microwave power; and a matching unit that is provided at least one of:
   between the traveling wave detecting unit and the antenna; and
   between the reflected wave detecting unit and the antenna, the matching unit to adjust impedance matching between the amplifying unit side and the antenna side, the storage unit stores at least the traveling microwave power detected by the traveling wave detecting unit, the reflected microwave power detected by the reflected wave detecting unit, and a matching constant table for defining adjustment values of the matching unit for the detected power, and when the traveling microwave power is detected by the traveling wave detecting unit and the reflected microwave power is detected by the reflected wave detecting unit, the control unit extracts a corresponding adjustment value from the matching constant table and sets the extracted adjustment value to the matching unit.

5. The projector according to claim 1, further comprising:

a control unit that controls at least a start operation of the projector; and a light detecting unit that includes an optical sensor for detecting the quantity of light emitted from the light emitting body, wherein the light source device further includes a matching unit that adjusts impedance matching between the amplifying unit side and the antenna side, and the control unit controls the matching unit to adjust impedance such that the quantity of light detected by the light detecting unit becomes larger when the microwave power is the same.

6. The projector according to claim 5, further comprising:

a temperature detecting unit that includes a temperature sensor for detecting the temperature around the light emitting body, wherein the control unit controls the temperature detecting unit to detect the temperature around the light emitting body, when the detected temperature is equal to or larger than a predetermined limited temperature, the control unit does not turn on the light source device.

* * * * *